United States Patent [19]

Hogenboom et al.

[11] Patent Number: 5,176,862
[45] Date of Patent: Jan. 5, 1993

[54] PROCESS FOR THE MANUFACTURE OF STRETCHED ROPE

[75] Inventors: Eric H. M. Hogenboom, Maastricht, Netherlands; Christiaan H. P. Dirks, Dilsen, Belgium

[73] Assignee: DSM N.V., Heerlen, Netherlands

[21] Appl. No.: 737,827

[22] Filed: Jul. 29, 1991

Related U.S. Application Data

[63] Continuation of Ser. No. 524,477, May 17, 1990, abandoned.

[30] Foreign Application Priority Data

May 19, 1989 [NL] Netherlands ............. 8901266

[51] Int. Cl.⁵ ............. D01D 5/06; D02J 1/22
[52] U.S. Cl. ............. 264/103; 264/205; 264/206; 264/210.8
[58] Field of Search ............. 264/103, 203, 205, 206, 264/210.8

[56] References Cited

U.S. PATENT DOCUMENTS 3,124,631  3/1964  Davis et al. .
3,266,232  8/1966  Dawborn et al. .
3,767,360  10/1973  Singh ............. 264/203
4,440,711  4/1984  Kwon et al. ............. 264/203
4,663,101  5/1987  Kavesh et al. ............. 264/203

FOREIGN PATENT DOCUMENTS 2053180  4/1971  France .
2042414  9/1980  United Kingdom .
2051667  1/1981  United Kingdom .

OTHER PUBLICATIONS

The Textile Institute, Textile Terms and Definitions, Feb. 1957, p. 100.
Webster's Seventh New Collegiate Dictionary, London: G. Bell & Sons, Ltd., 1963, p. 747.

Primary Examiner—Leo B. Tentoni
Attorney, Agent, or Firm—Cushman, Darby & Cushman

[57] ABSTRACT

The stiffness and the tensile strength of a rope containing polymeric filaments manufactured according to the gel spinning process are substantially increased by stretching it. The stretching is preferably carried out at elevated temperature but below the melting point of the filaments.

11 Claims, No Drawings

PROCESS FOR THE MANUFACTURE OF STRETCHED ROPE

This is a continuation of application Ser. No. 07/524,477, filed on May 17, 1990, which was abandoned upon the filing hereof.

The invention relates to a process for the manufacture of a rope comprising polymeric filaments manufactured according to the gel spinning process.

By 'rope' is understood in the present application: rope, cord, cable, string and similar structures comprising filaments or filaments and fibres.

The gel spinning process as known from GB-A-2,042,414 and GB-A-2,051.667 substantially consists in preparing a solution of a polymer, transforming the solution to filaments above the dissolution temperature of the polymer, cooling the filaments to below the dissolution temperature so that gelation occurs, and complete or partial removal of the solvent. The filaments can subsequently be stretched while the rest of the solvent is removed.

Such filaments show a high stiffness and a high tensile strength compared with filaments manufactured in a different manner from the same polymer by spinning.

A rope containing filaments that have been manufactured according to the gel spinning process also shows a high stiffness and a high strength. That is precisely why such a rope is used in situations where these properties are of much importance. It is therefore desirable to increase the stiffness and the strength of the rope still further.

The object of the invention is to provide a process for the manufacture of a rope containing polymeric filaments manufactured according to the gel spinning process, with a higher stiffness and a higher tensile strength that the known ropes. This is achieved by stretching a rope containing polymeric filaments manufactured according to the gel spinning process.

Such a rope shows a stiffness and a tensile strength which, depending on the degree of stretching, are significantly higher than the stiffness and the tensile strength of the original rope.

It is surprising that the stretching causes the stiffness and the tensile strength of the rope to increase because the filaments of which the rope is made are already stretched maximally during the spinning.

The tensile strength and the stiffness of the filaments increase with increasing degree of stretching during the spinning process.

The degree of stretching cannot be augmented unrestrictedly because rupture of the filaments during the production process occurs with increasing frequency as the degree of stretching is increased. It is easy to determine experimentally at what degree of stretching rupture of the filaments occurs with such a frequency that the corresponding frequency with which the process has to be interrupted is acceptable. This degree of stretching is called the maximum degree of stretching of the filaments.

It is possible to stretch such filaments somewhat further under very special conditions, for instance at a very low rate, but such further stretching hardly yields an increase in the stiffness and the strength of the filaments.

From the maximally stretched filaments thus obtained, yarns can be manufactured by the known processes for that purpose, such as bundling, twisting and/or twining.

From the yarns a rope can be manufactured by the known processes for that purpose, such as twisting, twining, plaiting and/or laying up.

Besides filaments produced according to the gel spinning process, the rope may also contain other filaments or fibres.

By stretching the rope its stiffness and tensile strength increase. The stretching is preferably effected at elevated temperature, but below the melting point of the filaments. At elevated temperature the stretching can be effected with less force or, using the same force, a higher rate of stretching is achieved.

The stretching of the rope can also be effected in several steps.

Polymers that can be processed to filaments with good results by means of the gel spinning process are for instance polyalkenes, polyvinylalcohol and polyacrylonitrile.

The polyalkenes preferably have a weight average molecular weight higher than 400,000.

Good results are obtained if polyethylene (PE) is chosen as polyalkene. This PE may contain a minor quantity, preferably at most 5 mol. %, of one or more alkenes that can copolymerize with it, such as propene, butene, pentene, hexene, octene and 4-methylpentene, and possess 1 to 10, preferably 2-6, methyl or ethyl groups per 1000 carbon atoms.

Other polyalkenes can also be considered, such as for instance propene homo- and copolymers. Further, the polyalkenes used may contain minor quantities of one or more other polymers, in particular alkene-1 polymers.

By 'polyvinylalcohol' are also understood copolymers containing vinylalcohol and minor quantities, preferably at most 5 mol. %, of one or more other monomers, such as vinylacetate, ethene and other alkenes. By 'polyacrylonitrile' are also understood copolymers containing acrylonitrile and minor quantities, preferably at most 5 mol. %, of one or more other monomers, such as methacrylates, acrylates, vinylacetate.

Further, is has surprisingly been found that rope manufactured from not maximally stretched filaments, preferably manufactured from filaments with a degree of stretching of 50% or more, significantly gains stiffness and strength when stretched, and can be given the same stiffness and strength as the rope manufactured from maximally stretched filaments and subsequently stretched.

The invention will be elucidated in the following by means of a number of examples with ropes made from polyethylene, polypropene and Kevlar (TM).

Rope 1 is laid up using 1600 denier polyethylene yarn, type Dyneema (TM) SK 60, manufactured according to the gel spinning process, and has the following structure: $7 \times 19 \times 2 \times 1600$. The strength of the rope, measured according to DIN 83305, is 73.8 kN. The tensile strength of the yarn, measured according to DIN 53834, is 3.20 GPa.

Rope 2 is laid up using 2000 denier polyethylene yarn, type Dyneema (TM) SK 60, manufactured according to the gel spinning process, the filaments not being stretched maximally but to 80%. Rope 2 has the following structure: $7 \times 19 \times 2 \times 2000$.

Rope 3 is laid up using Kevlar (TM) 29 1600 denier yarn and has the following structure: $7 \times 19 \times 2 \times 1600$. The strength of the rope is 51.7 kN.

Rope 4 is a randomly chosen rope made of polypropene filaments; it has a strength of 9.78 kN.

EXAMPLE I

Rope 1 is clamped in in a Zwick (TM) tensile tester. The clamp-to-clamp distance is 60 cm.

The rope is loaded at room temperature to 50% of the measured strength for 10 days. At the end of that period the rope shows an elongation of 5% and its strength is 99 kN.

EXAMPLE II

Rope 1 is stretched at 120° C. at a rate of 20 mm/min until the elongation of the rope is 5%. The subsequent strength of the rope is 87.8 kN.

EXAMPLE III

Rope 1 is stretched at 140° C. at a rate of 5 mm/min until the elongation of the rope is 5%. The subsequent strength of the rope is 90.9 kN.

EXAMPLE IV

Rope 1 is stretched at 140° C. at a rate of 5 mm/min until the elongation of the rope is 7.5%. The subsequent strength of the rope is 102 kN.

EXAMPLE V

Rope 1 is loaded 5000 times for a few seconds to 50% of its measured strength. The subsequent strength is 87.2 kN.

EXAMPLE VI

Rope 2 is stretched at 140° C. at a rate of 5 mm/min until the elongation of the rope is 23%. The subsequent strength of the rope is 91 kN.

EXAMPLE VII

Rope 3 is for 10 days loaded to 50% of its measured strength. The subsequent strength is 51.3 kN.

EXAMPLE VIII

Rope 3 is loaded 5000 times for a few seconds to 50% of its measured strength. The subsequent strength is 49.6 kN.

EXAMPLE IX

Rope 4 is stretched at 150° C. at a rate of 1 mm/min until the elongation of the rope is 5%. The subsequent strength of the rope is 9.06 kN.

Examples I, II, II, IV and V show that stretching of Rope 1 causes the initial strength to increase from 73.8 kN to 99, 87.8, 90.8, 102 and 87.2 kN respectively. It is clear that at elevated temperatures higher tensile strengths can be reached faster.

Example VI shows that yarns made of the polyethylene filaments which initially have not been stretched to their maximum strength can be laid up to form Rope 2, which after stretching at the same temperature and with the same rate of stretching as in Example III has acquired a similar higher tensile strength as Rope 1 in Example III, the filaments of which had been maximally stretched before manufacture of the rope.

The Kevlar Rope 3 of Example VII, treated in the same way as Rope 1 of Example I, after stretching shows a decrease in tensile strength from 51.7 to 51.3 kN.

The polypropene Rope 4 of Example IX also shows a decrease in tensile strength, from 9.78 to 9.06.

It is surprising that the ropes according to the invention gain tensile strength, while other ropes even show a decrease in tensile strength. This cannot be attributed to further stretching of the filaments, as appears from the following tests.

TEST I

The strength of Dyneema (TM) SK 60 1600 denier yarn is determined according to DIN 53834. The strength of the yarn is 3.20 GPa. The yarn is stretched at 120° C. at a rate of 20 mm/min until the elongation is 5%. The strength then is 3.28 GPa. The stretching has not brought about a significant increase in the strength of the yarn, nor consequently in that of the filaments.

TEST II

The rope stretched as described in Example II is unravelled, so that the 1600 denier yarn is obtained again. The strength of the yarn is 3.18 GPa. It appears that the strength of the yarn has not increased relative to the original yarn, while the strength of the rope has increased substantially as a result of the stretching.

We claim:

1. A method of producing a stretched rope containing polymeric filaments comprising the steps of:
    (i) preparing a solution of at least one polymer;
    (ii) transforming said solution to filaments above the dissolution temperature of said at least one polymer;
    (iii) cooling said filaments to below said dissolution temperature of said at least one polymer to order to induce gelation;
    (iv) removing all or a portion of the solvent;
    (v) stretching said filaments while removing remaining solvent;
    (vi) forming said filaments into yarns;
    (vii) forming a rope from said yarns;
    (viii) stretching said rope in order to increase stiffness and tensile strength.

2. Process according to claim 1, wherein the stretching is carried out at elevated temperature, but below the melting temperature of the filaments.

3. Process according to claim 1 wherein the filaments are manufactured from polyalkene with a weight average molecular weight higher than 400,000.

4. Process according to claim 3, wherein polyethylene is used as polyalkene.

5. Process according to claim 1, wherein the filaments are manufactured from polyvinylalcohol.

6. Process according to claim 1 wherein the filaments are manufactured from polyacrylonitrile.

7. Process according to claim 1, wherein the rope is manufactured from unstretched filaments and subsequently stretched.

8. Process according to claim 1, wherein the rope is manufactured from partially stretched filaments and subsequently stretched.

9. Process according to claim 1, wherein the rope is manufactured from maximally stretched filaments and subsequently stretched.

10. The method of claim 1 wherein said rope of step (vii) is twisted, twined, plaited or laid up.

11. The method of claim 1 wherein said rope of step (vii) is stretched to an irreversible elongated of maximally 7.5%.

* * * * *